May 8, 1945.　　　　R. W. LELAND　　　　2,375,422
LANDING GEAR
Filed March 31, 1943　　　2 Sheets-Sheet 1

INVENTOR
ROBERT W. LELAND
BY　Bueur, Hardman and Fehr
HIS　　ATTORNEYS.

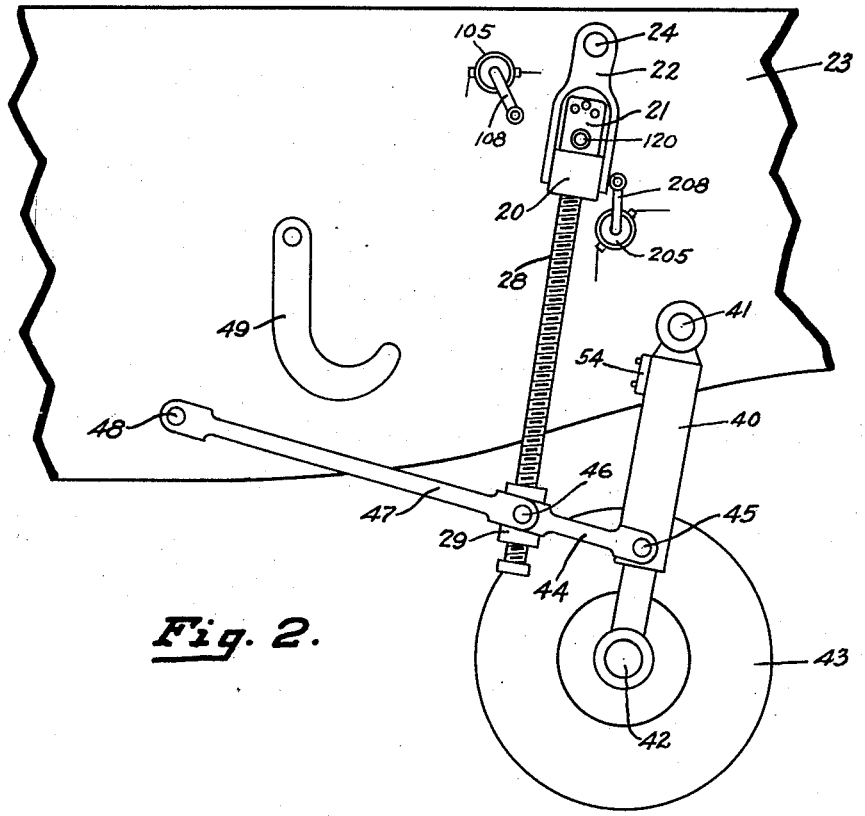
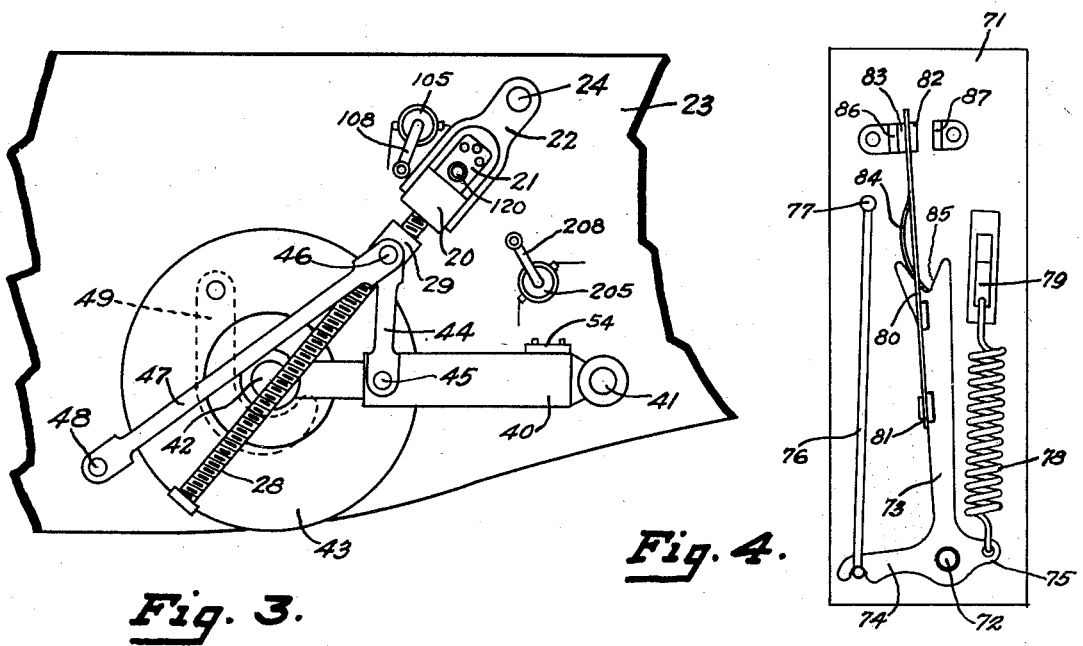

Patented May 8, 1945

2,375,422

UNITED STATES PATENT OFFICE 2,375,422

LANDING GEAR

Robert W. Leland, Dayton, Ohio, assignor to General Motors Corporation, Detroit, Mich., a corporation of Delaware Application March 31, 1943, Serial No. 481,235

17 Claims. (Cl. 172—239)

This invention relates to improvements in electrically operated, motion transmitting devices and particularly to improvements in the control apparatus for such a device.

The device of the present invention with the exception of the control apparatus therefor, is identical with the motion transmitting device illustrated, described and claimed in the copending application of Calvin J. Werner, Serial No. 468,475, filed December 10, 1942. That is, the motion transmitting device, per se, of the present invention comprises a housing upon which an electric motor is mounted and in which a screw shaft, provided with a traveling nut is rotatably supported so as to extend therefrom. In this housing there is provided a magnetic clutch which drivingly connects the motor with the shaft only when said magnetic clutch is energized. When said clutch is not energized a brake member in the housing is engaged for purposes of preventing rotation of the screw shaft.

It is among the objects of the present invention to provide apparatus adapted to control the operation of the motor driven motion transmitting device in such a manner that it will raise mechanism, such as the landing gear of an airplane, and place it securely in a fully retracted nesting position in which the landing gear is tightly held so that its load is completely removed from the motion transmitting device while said landing gear is retracted.

A further object of the present invention is to provide control apparatus for a motor driven motion transmitting device adapted to render said device effective either to raise or to lower its load in response to the manual shifting of a main control member from its normal inoperative position into one or the other of its operative positions.

A still further object of the present invention is to provide a motion transmitting or what may also be termed a load raising and lowering device with an electric motor as prime mover adapted to actuate the device for purposes of raising and lowering a load, said electric motor having characteristics, during the load lowering cycle only, causing it to act as a brake or retarding element when the load tends to increase the lowering speed of the device beyond a safe limit, thereby avoiding possible damage which might result if the lowering speed were not retarded.

Another object of the present invention is to provide an electric motor driven load raising and lowering device, which is normally locked against operation when the electric motor is not energized, with emergency control apparatus adapted, when actuated, to release the device and permit the load to move downwardly by gravity or to be manually lowered independently of the electric motor.

Further objects and advantages of the present invention will be apparent from the following description, reference being had to the accompanying drawings wherein a preferred embodiment of the present invention is clearly shown.

In the drawings:

Fig. 2 is a fragmentary view of an airplane fuselage equipped with the present invention, the device being shown in fully extended or landing position.

Fig. 3 is a view similar to Fig. 1, however, showing the device in the fully retracted and nested position.

Fig. 4 is a detail view of one of the control switches of the device.

Figure 1:
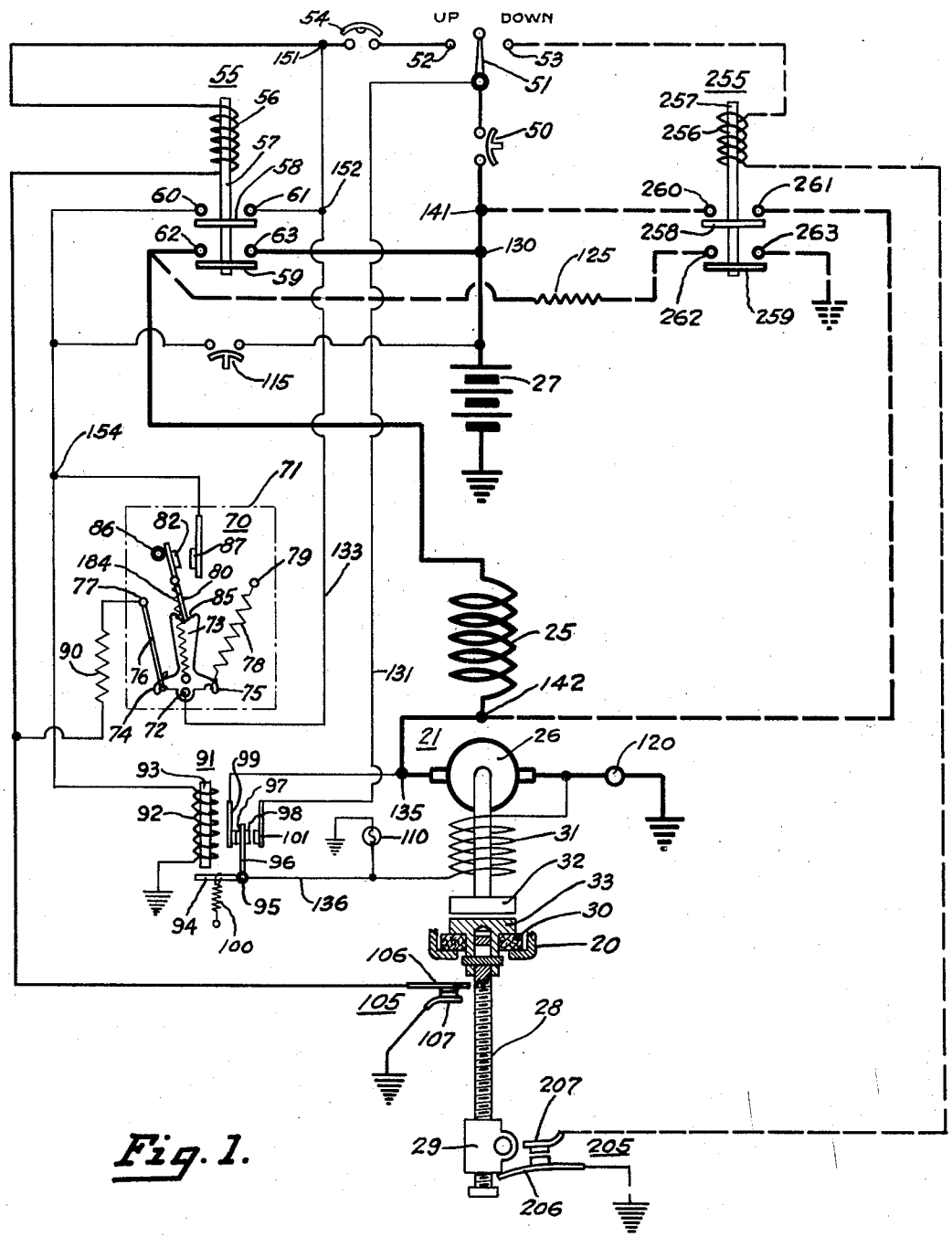
Fig. 1 is a wiring diagram of the invention illustrating the various elements, control devices and their circuit connections with a source of electrical power for actuating the device to raise and lower the load carried and moved by the device.

As has been stated in the preamble, the device of the present invention with the exception of the control apparatus therefor, is identical with the motion transmitting device illustrated, described and claimed in the copending application of Calvin J. Werner, Serial No. 468,475, filed Dec. 10, 1942. This motion transmitting device is shown in the drawings to comprise a housing 20 upon which an electric motor 21 is mounted. Housing 20 has the two arms of a member 22 secured thereto, this member 22 being pivotally secured to the fuselage 23 of an airplane at the point 24. This permits the device to swing as it is actuated to raise and lower the landing gear of the airplane.

The electric motor 21 has a field winding 25 and an armature 26. This motor with its field and armature circuits is adapted to be connected to a source of electric power, shown in the present instance to be a storage battery 27, so that the motor functions as a series motor when it actuates the device to raise or retract the landing gear and as a shunt motor when it acts to move the device to lower the landing gear.

The housing 20 which carries the motor rotatably supports a screw shaft 28 so that the screw shaft extends therefrom. Upon this screw shaft there is provided a traveling nut 29 constructed and arranged to carry the load. A suitable speed reducing gear is contained within the housing 20 and drivingly engages the end of the screw shaft 28 within the housing 20. An electromagnetic clutch is provided in housing 20, this clutch being adapted to be energized concurrently with the energization of the electric motor, drivingly to connect the electric motor with the speed reducing gear which, as has been stated, is operatively connected with the screw shaft 28. When the electric motor is inactive or not energized, the electromagnetic clutch will not be energized and therefore normally this electromagnetic clutch does not drivingly connect the motor with the screw shaft. When the electromagnetic clutch is not energized, a disc 33, connected with the speed reducing gear, frictionally engages a brake ring 30 which locks the screw shaft 28 against rotation. However, as soon as the electromagnet is energized then the brake ring 30 is no longer engaged and therefore is ineffective to hold the screw shaft 28 against rotation. In the circuit diagram the numeral 31 indicates the winding of the electromagnet which, when energized, will magnetize the driving disc 32 rotated by the electric motor. When the driving disc 32 is magnetized it will attract the movable disc 33, which is drivingly connected with the screw shaft 28 so as to be slidable longitudinally relatively thereto. When the disc 33 is attracted by the driving disc 32 it is moved out of its normal frictional engagement with the braking ring 30 and into gripping, driven engagement with the disc 32 which, as has been said, is rotated by the motor. The parts 30, 31, 32 and 33 illustrated in Fig. 1 are merely diagrammatic showings of the brake ring, the magnet winding, the driving disc and the armature disc, detailedly illustrated and described in the aforementioned application Serial No. 468,475 of Calvin J. Werner.

Any suitable or existing landing gear for an airplane may have the present invention applied thereto, however for purposes of illustration and description, a simple type of landing gear has been shown. This comprises the wheel supporting and shock absorbing strut 40 pivotally mounted upon the fuselage as at 41 and carrying a spindle 42 upon which the wheel 43 of the landing gear is mounted. A strut or lever arm 44 has one end thereof hingedly secured to the shock absorbing strut 40 as at 45, the other end being hingedly secured to the traveling nut 29 at the point 46. Another strut 47 has its one end hingedly secured to the nut 29 at the point 46, its opposite end being pivotally anchored to the fuselage 23 at the point 48. The Fig. 2 of the drawings shows the landing gear in fully extended or landing position. The device of the present invention is adapted to retract this landing gear and place it in the nested position as shown in Fig. 3 by the rotation of the screw 28 which causes the nut 29 to travel upwardly thereon, moving the landing gear into its nested position as shown in Fig. 3. In this position the landing gear rests in the nesting hook or gear 49 which is merely indicated and not detailedly shown inasmuch as it is no specific part of the combination forming the subject matter of the present invention and may be of any suitable standard type as used on present day airplanes. Suffice to say that this nesting apparatus is so engaged by a landing gear part when the gear is retracted that it will support the weight of the landing gear without having this weight applied to mechanism as illustrated and claimed in the present invention. This nesting hook or gear is readily moved to release the landing gear in any suitable manner when the pilot desires to lower the landing gear.

The Fig. 1 is a wiring or circuit diagram showing the electrical connections between the various electrical elements of the device and the source of electric power, the storage battery 27. The numeral 50 designates the overload breaker which is closed by the pilot when the airplane is to be flown and which is adapted automatically to disconnect the storage battery from the control system in case of abnormal current conditions. The selector control switch available to the pilot for effecting raising and lowering of the landing gear is designated by the numeral 51, this switch having a neutral inactive position as shown in the diagram, but being movable out of this neutral position to engage a stationary contact 52 for connecting the storage battery 27 to a circuit to effect raising of the landing gear. Switch 51 may also be operated from its neutral inactive position into engagement with a stationary contact 53 whereby circuits are completed to effect lowering of the landing gear. A safety switch 54, connected in the main control circuit is adapted to be held open and prevent operating the device to retract the landing gear while the plane is on the ground. As soon as the airplane leaves the ground, this switch closes and renders the device capable of being operated. Any suitable arrangement may be used. For instance, a switch adapted to be opened by pressure may be associated with the hydraulic shock absorber strut 40 in such a manner that when the landing gear wheels 43 strike the ground and the weight of the airplane causes the shock absorber to be partially collapsed, a pressure will be established in the shock absorber which is applied to the switch 54 to hold it open only while the wheels and shock absorber are supporting the load of the airplane. Instead of the switch being operated by pressure created within the loaded shock absorber, it may also be arranged that the switch 54 be actuated mechanically by the partially collapse of the shock absorber due to the weight of the airplane being applied thereon while the airplane is grounded.

Two separate automatic control devices in the form of electromagnetically operated switches 55 and 255 are provided these switches being mechanically interlocked in any way to prevent concurrent operation. The switch 55 is in the circuit to effect the raising of the landing gear, the switch 255 being in the circuit to effect the lowering of the landing gear. Switch 55 comprises a magnet winding 56 surrounding a movable core 57 which carries bridging contacts 58 and 59. When moved out of normal position by energization at winding 56, bridging contact 58 engages stationary contacts 60 and 61 to complete a circuit therebetween while at the same time bridging contact 59 engages stationary contacts 62 and 63 to complete a circuit therebetween.

Another of the control devices of the present invention consists of the delay-action relay 70. This relay, for reasons to be given later, is included only in the circuits of the device effecting the landing gear raising movements. The Fig. 4 detailedly shows this delay-action relay as comprising an insulating base 71 having a pin 72 upon which is pivotally mounted the switch lever 73. Oppositely extending arm portions 74 and 75 are provided on the switch lever 73 adjacent its pivotally mounted end. A thermal-electric element in the form of a wire 76 has its one end mechanically and electrically secured to the arm 74, the opposite end of said thermal electric wire being anchored to a terminal pin 77 carried by the insulating base 71. The arm 75 of the switch lever 73 has one end of a spring 78 secured thereto, the other end of said spring being anchored to a clip 79 attached to the insulating base 71 in any suitable manner.

The switch lever 73 has a resilient contact arm or blade 80 secured thereto at the point 81, the free end of said contact arm or blade 80 being provided with contact elements, the one designated by the numeral 82 being on one side of contact arm or blade, the contact 83 on its opposite side. A resilient finger 84 is struck from or secured to the contact arm or plate 80, the free end of this integral finger resting in the V-shaped groove 85 formed in the end of the switch lever 73.

The action of the spring 78, connected to the one arm 75 of the switch lever 73, is to maintain tension upon the thermal electric element or wire 76 by the constant counterclockwise force exerted by said spring 78 upon the switch lever 73. When no current passes through the thermal electric element 76 and it is therefore normally cool, it is so adjusted that the switch lever 73 has the bottom of the V-shaped notch in the end thereof in a position to the right of the contact blade 80 as regards Fig. 4 so that the resilient finger 84 will exert a force upon the contact blade 80, thereby urging said blade toward the stationary contact 86 secured to the insulating base 71. In the present system this contact 86 is not a live, active member of the system but merely acts as a stop. If, however, the thermal electric element 76 is heated by current passing therethrough, it will expand due to such heat, permitting the spring 78 to move the switch lever counterclockwise about its pivotal support 72. As the expansion of thermal electric element 76 continues, the counterclockwise movement of lever 73 by spring 78 will be effected and eventually the point of engagement between the resilient finger 84 of the contact blade with the forked or V-shaped end 85 of the said switch lever 73 will be moved to the left side of said blade 80, thereby positioning the resilient finger 84 so that it will exert a force quickly to move the contact blade from the position shown in Fig. 4 into the position in which the contact 82 on blade 80 engages the stationary contact 87 carried by the insulating mount 71 of the switch, said stationary contact 87 being an active or live one in the present system. In the diagrammatic view Fig. 1 a simplified form of the delayed-action relay is shown. Fig. 4 shows a preferred and actual construction of the delayed-action relay, however, a simpler form of the device is illustrated in the diagram Fig. 1 which merely shows a coil spring 184 acting as the flipper to move the contact blade 80 from one position to another as the switch lever 83 is moved, this coil spring performing the same duties as does the finger 84 integral with the contact blade 80.

A relay current limiting resistor 90 has one end connected with the terminal post 77 to which also is connected one end of the thermal electric element or wire 76, the other end being connected to the wire leading to the switch 105.

Another element of the control apparatus of the present invention comprises the electromagnet relay 91. It consists of an electromagnet winding 92 around a stationary core 93. An armature 94, adapted to be attracted and moved when the core 93 is energized, is pivotally mounted at 95 and has a contact arm 96 supporting contacts 97 and 98 respectively on its opposite sides. Contact 97 normally engages contact 99 due to the fact that a spring 100 holds the armature 94 in its normal, unattracted position. Contact 98 is adapted to engage contact 101 when the core 93 is energized and attracted and moves the armature 94 clockwise about its pivot 95 and against the effect of spring 100.

An "up" limit switch 105 is provided, said switch comprising the movable contact arm 106 adapted to engage the stationary contact arm 107. This switch 105 is mounted on the fuselage 23 of the plane as shown in Figs. 2 and 3 so that its operating arm 108 may be engaged by a moving part of the landing gear of the plane so as to operate the switch to move its contact 106 from engagement with its associate contact 107 when the traveling nut 29 of the device reaches a predetermined point in its upward movement on the screw shaft 28. In the Figs. 2 and 3 the actuating arm 108 of switch 105 is shown engageable by the member 22 which is hingedly secured to the fuselage 23 at the point 24. Fig. 2 shows this operating arm 108 of switch 105 disengaged by member 22 so that contacts of switch 105 will be closed, while Fig. 3 shows the operating arm 108 engaged by the member 22 and actuated into a position in which contacts 106 and 107 of switch 105 are separated.

Similarly a switch 205 is provided in the circuit affecting downward movement of the device, this switch 205 comprising a stationary contact 207 and a movable contact 206. Switch 205, like switch 105, has an operating member 208 adapted to be engaged by the member 22 of the device to open contacts 206 and 207 when the landing gear is fully extended and in its landing position as shown in Fig. 2 and to be released to permit closing of contacts 206 and 207 when the landing gear moves from its extended position toward its nested position as shown in Fig. 3.

The numeral 110 designates a pilot light, circuit through which is completed visibly to indicate when the motor or clutch are energized to raise or lower the landing gear. An emergency brake release switch 115 is provided for energizing the electromagnetic winding 31 to release the device from the brake ring 30 and permit lowering of the landing gear by gravity and/or by any suitable manual means when any part of the electrically controlled apparatus is accidentally rendered inactive or is damaged in any manner. A thermal protective device 120 is connected in circuit with the motor for purposes of protecting the motor against damage by overloading or otherwise. The landing gear lowering circuits, shown in dash lines, will now be described.

The electromagnetic switch 255 comprises an electromagnet winding 256 surrounding a movable core 257 which carries bridging contacts 258 and 259. When moved by the energization of electromagnetic winding 256 these bridging members are adapted concurrently to engage contacts. The bridging member 258 will engage and connect stationary contacts 260 and 261 respectively, and the bridging member 259 will engage and connect stationary contacts 262 and 263 respectively.

A shunt field resistor 125 is connected between the stationary contact 62 of the electromagnetic switch 55 and the stationary contact 262 of the electromagnetically operated switch 255.

The various electrical devices of the entire system having now been properly identified, their circuit connection for the purpose of raising and lowering the landing gear will now be described.

With the landing gear in fully extended position as shown in Fig. 2 the pilot after leaving the ground and attaining flying speed and altitude, closes the circuit breaker 50 and moves selector switch 51 from its neutral position into engagement with stationary contact 52 to complete the following circuit; from the battery 27 across switches 50, 51 and 54, through electromagnet winding 56 to contact 106 of the up limit switch 105, then through the other contact 107 of said switch back to the battery via the ground connection. Energization of the magnet winding 56 will cause the magnet core 57 of switch 55 to be moved upwardly bringing the bridging contact 58 into engagement with its cooperating stationary contacts 60—61 and bridging contact 59 into engagement with its cooperating stationary contacts 62—63.

Connecting contacts 62—63 by bridging contact 59 completes the main motor circuit from battery 27 to junction point 130, across contacts 62—63, field winding 25 and armature 26 of the motor 21 then through thermal protector 120 back to battery via ground. Completion of this circuit causes the motor to operate in one direction as a series motor. At the same time current will flow from the junction point 135 in the motor circuit, to relay contact 99 and its engaging contact 97, through relay armature arm 96, wire 136, electromagnetic clutch winding 31, thermal protector 120 through ground back to the battery. This results in energization of the magnet clutch whereby the armature disc 33, drivingly secured to the screw shaft 28 and normally engaging the brake ring 30 to hold said shaft against rotation, is moved from engagement with said brake ring 30 and into gripping engagement with the motor driving disc 32 which is magnetized by the energization of clutch winding 31 and is driven by the motor. Now the series operating motor drives the screw shaft 28 in one direction, causing the nut 29 thereon to move upwardly and lift the landing gear. As said nut moves upwardly the contacts 206 and 207 of the down limit switch are again brought into engagement for purposes to be described.

Concurrently with the bridging of contacts 62—63, the stationary contacts 60—61 of switch 55 are bridged by contact 58 to complete the following circuit; battery 27, switches 50, 51 and 54, junction points 151 and 152 contacts 61—58—60 through relay magnet winding 92 back to battery via ground. This energizes magnet winding 92 of relay 91 and magnetizes core 93 to attract armature 94 and move it clockwise against the effect of spring 100. As the armature 94 is moved contacts 97—99 are separated and contacts 98—101 are engaged closing the following circuit; from switch 51 through wire 131 to contact 101 then contact 98 through armature arm 96, magnet clutch winding 31, thermal protector 120 back to battery via ground. This new circuit through winding 31 eliminates the first circuit therethrough which included contacts 97—99, now separated.

The operation of switch 51 to engage its stationary contact 52 results in the immediate completion of the circuit from junction 151 through wire 133 to the pivoted lever 73 of the delayed action relay 70 then through the thermo-electric element 76 one end of which is attached and connected to the lever 73 to terminal 77 to which the other end of element 76 is connected, through resistance element 90 to the line connecting the winding 56 with switch 105 having a ground connection. As the current flows through the thermo-electric element 76 said element will be heated and as a result will expand. The expansion of element 76 permits the spring 78 to become effective to actuate the switch lever 73 counterclockwise about its pivotal support 72 and consequently a shifting of the pivotal engagement of contact blade or arm 80 with the V shaped notch in lever 73 from the one, or right side of blade 80 (spring 184 in the diagrammatic view) to the other or left side thereof, at which time the contact carrying blade 80 will quickly be shifted from engagement with stop 86 to a position in which contact 82 on said blade will engage contact 87. Now the following circuit is established; battery 27, switches 50, 51, and 54, junction point 151, wire 133 to the switch lever 73, contact 82 on blade 80, contact 87 to junction point 154 thence to the relay winding 92 to energize the relay and maintain its contacts 98—101 closed.

Relay 70 is so constructed and arranged that it will maintain the circuit across its contacts 82—87 even after the current flow through the thermo-electric element 76 has been interrupted by the opening of the up limit switch 105 when the nut 29 reaches the full landing gear retracted position. As soon as current flow through the thermo-electric element 76 has been interrupted, heating of the element stops and cooling thereof begins. As it cools said element gradually contracts and slowly moves the relay lever 73 clockwise against the effect of the spring 78. The thermo-electric element 76 and spring 78 are so designed and constructed that a predetermined period of time is required to have the thermo-electric element cool and contract sufficiently to move lever 73 clockwise and effect separation of contacts 82—87 thereby terminating the energizing current flow through the relay winding 92 and causing said relay to break the existing energizing circuit through the clutch magnet winding 31 so that the electromagnetic clutch is completely deenergized. When this occurs the disc 33 is released by the motor driving disc 32 and is moved into gripping engagement with the brake ring 30 to prevent rotation of the screw shaft 28.

An emergency brake release switch 115 is provided which when closed completes a circuit from the battery 27, across the switch to the line leading to the relay magnet winding 92. If switch 115 is closed the relay 91 is energized to close contacts 98—101 then closing of the circuit-breaker 50 connects the storage battery 27 with the electromagnetic clutch winding 31 to energize it so that disc 32 is energized to attract disc 31 moving it out of gripping engagement with the brake ring 30.

As shown in the copending application S. N. 468,475, previously referred to, means are provided for manually operating the nut along the screw shaft to actuate the landing gear if, for any reason, the electrical system has been damaged so that it cannot operate to raise and lower the landing gear. Long and tedious manual operation is necessary to effect full movement of the landing gear in either direction. If certain parts of the electrical system are undamaged then the circuits described in the aforegoing paragraph are available to release the screw shaft 28. This substantially reduces the manual lowering operation of the landing gear for under these arrangements all the pilot needs to do is to manually release the landing gear from the nesting apparatus, then the weight of said gear upon the nut will effect turning of the now free screw shaft to lower the landing gear by gravity.

The aforegoing description covers all of the devices and circuits utilized to cause the motor to operate as a series motor for raising the landing gear. For lowering said gear the pilot moves switch 51 into engagement with contact 53 thus energizing the electromagnetic switch 255 to complete circuits between the motor to effect its operation as a shunt wound motor for rotating the screw shaft 28 in a direction opposite to that in which it is rotated by the motor acting as a series motor. The circuits for the lowering operation are mainly shown in dash lines.

The weight of the landing gear on the nut 29 will cause an acceleration of the screw shaft rotation in the lowering direction, which, if not controlled, will permit the lowering movement of the landing gear to attain excessive speed resulting in the landing gear striking its fully extended position with a force which may prove damaging, at least uncomfortable. To control this lowering movement applicant changes his motor from a series acting motor for gear raising into a shunt motor for landing gear lowering purposes. When the heavy load of the landing gear on the nut accelerates the rotation of the screw shaft, the motor, connected thereto by the energized clutch magnet winding 131, will likewise be rotated at an accelerated speed which, when it reaches a predetermined rate, causes the shunt motor to act as a generator building up a counter electromotive force in the circuit which reacts to retard the speed of the motor and thus hold it within a safe operating margin. Thus the excessive lowering speed is avoided and the possibility of damage for this reason is eliminated. The motor of the present invention therefore acts as a powerful series motor for landing gear retraction and as a speed regulating shunt motor for landing gear lowering.

*Operation—up cycle*

When the pilot has attained flying altitude, to raise or retract the landing gear he closes circuit breaker 50 and moves the control switch 51 to engage contact 52. With the landing gear extended contacts 106 and 107 of switch 105 are closed. Now the magnet switch 55 is rendered effective automatically to close the motor circuit causing the motor to operate in one direction as a series motor. The magnet clutch is also energized whenever the motor circuit is closed so that the screw shaft 28 is released from the brake 30 and operatively connected to the motor so as to be rotated thereby. As the screw shaft rotates the nut 29 moves upwardly, toward the motor 21, permitting switch contacts 206 and 207 of switch 205 to close. As soon as the control switch 51 engages its contact 52 the circuit through the thermo-electric element 76 of the delay action relay is completed and the relay is now being conditioned to close a circuit which will maintain the clutch magnet energized a predetermined period after the motor is rendered inoperative. The closing of the electro-magnet switch 55 also completes a circuit through relay 91 which renders said relay effective to establish a separate energizing circuit through the clutch magnet winding 31 substantially simultaneously with the closing of switch 55. This separate clutch magnet circuit is independent from the clutch magnet circuit leading from the motor circuit at junction 135 and is, as described, under the control of relay 91.

When the landing gear reaches its fully retracted position the nut 29 will have opened the switch 105 thus breaking the control circuit of magnet switch 55 and causing it to open the motor circuit and the energizing circuit leading from said switch 55 to the relay 91. This stops motor operation and ordinarily would cause de-energization of the clutch magnet winding 31. However, it has been stated previously that relay 70 is preconditioned by the closing of the circuit through its thermo-electric element 76 to eventually close contacts 82—87 of said relay 70. These contacts 82—87 engage before switch 105 is opened by nut 29 as the landing gear reaches its fully retracted position. When switch 105 is thus opened the relay 70 preconditioning circuit through its thermo-electric element 76 is broken. Now the relay 70 maintains its separate circuit through the relay 91 which separate circuit was completed before the circuit of switch 55 to relay 91 was broken. Relay 70 maintains its separate circuit to relay 91 to keep it energized and close a circuit to the magnet winding 31 for a predetermined period of time, specifically until the thermo-electric element cools and expands to effect opening of the contacts 82—87. During this maintenance of the clutch winding circuit the disc 33 is held from engagement with the brake ring and so the screw shaft 28 is free to rotate. This control is provided to permit the landing gear to drop, by gravity, from its fully retracted position in which it opens switch 105 into nesting engagement with any suitable nesting apparatus diagrammatically illustrated at 49. This removes the load of the landing gear from the screw shaft and nut and places it upon the sturdy nesting apparatus. After the landing gear is so nested the relay thermo-electric element 76 will have expanded sufficiently to open the circuit to relay 91 permitting its armature to be moved to normal position by its spring 100 and thus open the clutch magnet circuit. This causes the disc 33 to engage brake ring 30 and lock the screw shaft against rotation.

*Operation—down cycle*

When it is desired to land the airplane the pilot, actuates the switch 51 to engage the contact or terminal 53 which permits current from the battery 27 to flow through the electromagnet winding 256 of switch 255 and across contacts 207—206 of switch 205 back to the battery via ground. Energization of winding 256 moves the core 257 to shift bridging members 258 and 259 into engagement with their respective pairs of stationary contacts 260—261 and 262—263 respectively. Now the following motor circuits are established; from battery 27 to the junction 141 thence across contacts 260—258 and 261 to junction 142, field winding 25, through the wire leading to the contact 62 of switch 55, shunt field resistance 125, across contacts 262—259 and 263 back to battery via the ground connections. This is the field circuit of the motor 21. The armature circuit of said motor leads from junction 142 to and through the armature 26, thermal protector 120 to battery via ground. These circuits render the motor operative as a shunt wound motor rotating in a direction opposite to its rotation as a series motor. Closing of said shunt motor circuits renders the clutch magnet winding 31 effective to move the disc 33 out of engagement with the brake ring 30 and into operative engagement with the motor driven disc by the following circuit; from junction 135, across contacts 99—97 and arm 96 of relay 91, wire 136 leading to said magnet winding. Now the screw shaft 28 is driven by the shunt motor to cause the nut 29 to move downwardly on said shaft and lower the landing gear. This movement of the device results in a closing of the contacts 106—107 of switch 105 and when the landing gear reaches its fully extended position the contacts of the down limit switch 205 are separated thus breaking the energizing circuit through switch 255 and causing said switch to open the motor circuits and terminate motor operation.

From the aforegoing description it may clearly be seen that applicant has provided an improved motion transmitting device particularly adapted to be installed in airplanes for the purpose of controlling the raising and lowering of the landing gear thereof. This motion transmitting device is operated by a single motor and connectible screw shaft and nut which may be constructed and arranged to form one of the struts of the landing gear, the motor acting as the powerful prime mover to raise the comparatively heavy landing gear into retracted nesting position and also capable of acting as a speed retarding shunt wound motor capable of lowering the landing gear into its extended landing position at a proper and safe lowering speed. The device is rendered effective to raise and lower the landing gear by the mere manipulation of a single simple control switch from its normal neutral position into either one or another of its active operating positions.

While the embodiment of the present invention as herein disclosed, constitutes a preferred form, it is to be understood that other forms might be adopted, all coming within the scope of the claims which follow.

What is claimed is as follows:

1. A device for lowering and raising a load comprising in combination, a reversible electric motor having field and armature circuits adapted to be connected to a source of power; a screw shaft adapted to be driven by said motor; a load carrying nut on said screw shaft; an electromagnetic clutch normally disconnected from the motor and holding the screw shaft against rotation; circuit controlling means for connecting the power source with the motor field and armature circuits in series and with the electromagnetic clutch to effect energization of the motor and clutch whereby rotation of the screw shaft is effected in one direction only; and other circuit controlling means adapted to connect the power source with the motor field and armature circuits in parallel and with the electromagnetic clutch to effect rotation of the shaft in the opposite direction.

2. A device in accordance with claim 1 in which, however, each circuit controlling means comprises normally open, automatic switches adapted to complete circuits between the source of electric power, the magnetic clutch and the motor field and armature to effect operation either as a series or shunt motor to operate the screw shaft; and a selector switch adapted, when operated into one position, to render one circuit controlling means active and when actuated in another position to render the other circuit controlling means effective.

3. A motion transmitting device comprising in combination, an electric motor having field and armature circuits adapted to be connected to a source of power; a screw shaft having a motion transmitting nut thereon; means normally holding the screw shaft against rotation, but adapted to be actuated for operatively connecting the motor with the screw shaft; an electromagnet for actuating said means; circuit controlling means adapted concurrently to connect the source of power with the motor field and armature circuits for effecting its operation as a series motor and with the electromagnet to energize it, whereby the shaft will be rotated in one direction; other circuit controlling means adapted concurrently to connect the source of power with the motor field and armature circuits to effect its operation as a shunt motor and with the electromagnet for effecting turning of the shaft in the opposite direction; and a selector switch manually operable into one or the other position to render one or the other of said circuit controlling means effective to complete connections.

4. A motion transmitting device comprising in combination, a reversible electric motor having field and armature circuits adapted to be connected to a source of electric power; a screw shaft having a traveling nut thereon; coupling means normally holding the screw shaft against rotation, adapted to be electrically energized to free the screw shaft and to connect the motor with the shaft; circuit controlling means for connecting the source of power with the coupling means and with the motor field and armature circuits in series to effect rotation of the shaft in one direction; other circuit controlling means for connecting the source of power with the coupling means and with the motor field and armature circuits in parallel to effect rotation of the shaft in the opposite direction; and a selector switch adapted to be operated to render either one or the other of said circuit controlling means effective to complete connections.

5. A device for raising or lowering a load comprising in combination, an electric motor having field and armature circuits adapted to be connected to a source of electric power; a screw shaft having a nut thereon upon which the load is adapted to be applied; means normally holding the screw shaft against rotation and adapted to be energized operatively to connect the screw shaft with the motor so as to be rotated thereby; circuit controlling means adapted to connect the source of power with the said means and the motor field and armature circuits for effecting operation of the motor as a series motor to rotate the shaft so that its nut moves to lift the load; other circuit controlling means adapted to connect the source of power with the said means and the motor field and armature circuits for effecting motor operation as a shunt motor to rotate the shaft so that its nut moves to lower the load; and a selector switch adapted to be operated to render either circuit controlling means effective to complete connections.

6. A device for raising and lowering a load comprising in combination, a reversible electric motor having field and armature circuits adapted to be connected to an electric power source; a screw shaft provided with a traveling nut adapted to carry the load; an electromagnetic clutch adapted, when energized, drivingly to connect the motor with the shaft; means engaged by the electromagnetic clutch when deenergized, for holding the shaft against rotation; two separate circuit controlling means for connecting the power source with the electromagnetic clutch to energize it and with the motor field and armature circuits to effect operation of the motor in opposite directions, one as a series motor and the second as a shunt motor; limit switches for effecting opening of the motor circuit when the traveling nut reaches a predetermined point adjacent the inner or outer end of the screw shaft, respectively; and a selector switch manually operable to render one or the other of said circuit controlling means effective to cause motor operation.

7. A device for raising and lowering a load comprising in combination, a housing; a reversible electric motor mounted on said housing and having field and armature circuits adapted to be connected to a power source; a screw shaft rotatably carried by and extending from said housing; a traveling nut on said screw shaft for carrying the load; an electromagnetic clutch comprising a magnet winding and a movable member drivingly secured to the screw shaft and adapted to be moved into operative engagement with the motor when the magnet winding is energized; a friction brake member normally engaged by the movable member when the magnet winding is not energized for preventing rotation of the screw shaft; two separate circuit controlling means for connecting the power source with the magnet winding to energize it and with the motor field and armature circuits to effect operation of the motor in opposite directions one, as a series motor, and the opposite as a shunt motor; limit switches adapted to stop motor operation when the nut reaches predetermined points in its travel in one or the other direction respectively; and a selector switch manually operable to render one or the other of said circuit controlling means active to effect motor operation.

8. A device for raising and lowering a load comprising in combination, a housing; a reversible electric motor mounted on said housing and having field and armature circuits adapted to be connected to a power source; a screw shaft rotatably carried by and extending from said housing; a traveling nut on said screw shaft for carrying the load; an electromagnetic clutch comprising a magnet winding and a movable member drivingly secured to the screw shaft and adapted to be moved into operative engagement with the motor when the magnet winding is energized; a friction brake member engaged by the movable member when the magnet winding is not energized for preventing rotation of the screw shaft; circuit controlling means for connecting the power source with the magnet winding and with the motor field and armature circuits in series to effect rotation of the screw shaft in a direction in which the nut thereon is moved to lift the load; another circuit controlling means for connecting the power source with the magnet winding and with the motor field and armature circuits in parallel to effect rotation of the screw shaft in the opposite direction whereby the nut is moved to lower the load; limit switches adapted to break the motor circuits and stop motor operation when the nut reaches a predetermined position in either its load lifting or load lowering movement respectively; and a selector switch for rendering either of said circuit controlling means effective.

9. A device for raising and lowering a load, comprising in combination, a reversible electric motor having field and armature circuits adapted to be connected to a power source; a screw shaft having a nut thereon for carrying the load; an electromagnetic clutch adapted, when energized, operatively to connect the motor with the screw shaft; braking means for holding the screw shaft against rotation when the electromagnetic clutch is not energized; control mechanism for directly connecting the power source with the motor field and armature circuits and with the electromagnetic clutch for rendering them effective to rotate the screw shaft in either direction; limiting switches adapted to be actuated automatically to break the motor circuits and render them inoperative when rotation of the shaft has moved the nut into a predetermined position adjacent one or the other end of the shaft; and means rendered effective by the closing of said control mechanism to break the first established clutch circuit and complete a second circuit through the electromagnet clutch when the power source is connected with the motor field and armature circuits to rotate the motor in one direction, said means being adapted to maintain the said second circuit for a predetermined time after the limiting switch has effected opening of the motor circuits.

10. A device for raising and lowering a load, comprising in combination, an electric motor having field and armature circuits adapted to be connected in series with a source of power to rotate the motor in one direction and in parallel to effect motor rotation in the opposite direction; a screw shaft having a traveling nut adapted to carry the load; an electromagnetic clutch adapted, when energized, operatively to connect the motor with the shaft; means adapted to hold the screw shaft against rotation when the electromagnet clutch is not energized; separate switching apparatus, one adapted to connect the power source with the clutch and the motor field and armature circuits to effect rotation of the screw shaft in one direction, the other apparatus to effect rotation of the screw shaft in the opposite direction, each apparatus including a limit switch adapted to effect breaking of the motor circuit and stop motor operation when the nut on the screw shaft has been moved to a predetermined position adjacent one or the other end of said shaft respectively; means rendered effective to break the first established clutch circuit and to complete another circuit through the electromagnet clutch to energize it solely by the operation of the one switching apparatus to effect motor rotation in the one direction, said means maintaining said other clutch circuit effective for a predetermined period after the limit switch has broken the motor circuit previously closed by the said one switching apparatus; and a selector switch for rendering effective either one or the other of said switching apparatus.

11. A device for raising and lowering a load, comprising in combination, a reversible electric motor having field and armature circuits adapted to be connected to a power source; a screw shaft having a nut thereon for carrying the load; an electromagnetic clutch adapted, when energized, operatively to connect the motor with the screw shaft; braking means for holding the screw shaft against rotation when the electromagnetic clutch is not energized; control mechanism for connecting the power source with the motor field and armature circuits and with the electromagnetic clutch for rendering them effective to rotate the screw shaft in either direction; limiting switches adapted to be actuated automatically to break the motor circuit and render it inoperative when rotation of the shaft has moved the nut into a predetermined position adjacent one or the other end of the shaft; and a delayed action relay having a circuit adapted to be energized to operate the relay for maintaining the clutch circuit for a predetermined period after said motor and its associated circuits are rendered inactive by a limit switch, whereby the loaded nut may rotate the screw shaft and motor for said period.

12. A device for raising or lowering a load comprising, in combination, a reversible electric motor having field and armature circuits adapted to be connected to a source of electric power; a screw shaft having a nut for receiving the load; a magnet clutch adapted to be connected to the power source and energized for connecting the motor with the screw shaft; a braking means normally engaged by a part of the clutch so as to be effective to prevent rotation of the screw shaft when the magnet clutch is not energized; control mechanism adapted to connect the power source with the magnet clutch and motor field and armature circuits to energize them and cause the motor to rotate in one direction as a series motor whereby the screw shaft is rotated to move the nut through its load lifting cycle; a limit switch for breaking the motor circuit when the nut has lifted the load to a predetermined point; a second control mechanism adapted to connect the power source with the magnet clutch and motor field and armature circuits to energize them and cause the motor to rotate in an opposite direction as a shunt motor, whereby the screw shaft is rotated to move the nut through its load lowering cycle; a limit switch for breaking this motor circuit to render the motor inactive when the nut has lowered its load to a predetermined point; and a manual control member for rendering either one or the other of said control mechanisms effective to close their circuits.

13. A device as defined by claim 12, provided, however, with means rendered effective to establish a second circuit to the magnet clutch only when the one control mechanism renders the motor active as a series motor to lift the load, and means cooperating with the aforementioned means for maintaining the second magnet clutch energizing circuit for a predetermined period after the limit switch has rendered the motor inactive as a series motor.

14. A device in accordance with claim 12, provided however, with a delayed action relay adapted to be energized and actuated only when the motor is rendered effective as a series motor, for maintaining said magnet clutch energized for a predetermined period after the motor ceases to be active as a series motor.

15. A device in accordance with claim 12 provided, however, with a thermal relay concurrently energized with the electric motor when it acts as a series motor, for maintaining the magnet clutch energized for a predetermined period after the motor has been rendered inactive, whereby the shaft is free of the braking means and may be rotated by the loaded nut thereon.

16. A device for raising and lowering a load comprising in combination, a reversible electric motor adapted to be connected to a source of electrical power; a screw shaft provided with a nut for carrying a load; a brake; an electromagnetic clutch having a movable member slidably secured to the screw shaft and normally engaging the brake to prevent rotation of the shaft, said clutch being adapted to be energized whenever the motor is energized to shift the movable member out of engagement with the brake and into operative engagement with the motor; selective means for connecting the source of power with the motor and clutch to effect rotation of the screw shaft by the motor in one or the other direction; limit switches for opening the motor circuit when rotation of the shaft has moved the nut into one or the other of its extreme positions on said shaft; and a thermal relay rendered effective only in response to the closing of the motor circuit for operation in one direction, for maintaining said clutch circuit for a predetermined time after the opening of the motor circuit by a limit switch.

17. A device as defined by claim 12, provided, however, with a magnet switch; a delayed action relay automatically brought into effect by the closing of the motor circuit to cause the motor to act as a series motor for energizing the magnet switch to maintain said magnet clutch circuit after the motor circuit has been broken by a limit switch; and separate manually operable means for energizing the magnet switch to complete a circuit through the magnet clutch.

ROBERT W. LELAND.